Nov. 21, 1950         G. E. CUTTAT         2,530,813
                      AUTOMATIC LATHE
Filed Dec. 28, 1946                      2 Sheets-Sheet 1

INVENTOR
Georges Emile Cuttat
By Robert E. Burns
ATTORNEY

Nov. 21, 1950 — G. E. CUTTAT — 2,530,813
AUTOMATIC LATHE

Filed Dec. 28, 1946 — 2 Sheets-Sheet 2

INVENTOR
Georges Emile Cuttat
By Robert E. Burns
ATTORNEY

Patented Nov. 21, 1950

2,530,813

UNITED STATES PATENT OFFICE 2,530,813

AUTOMATIC LATHE

Georges Emile Cuttat, Geneva, Switzerland, assignor to Manufacture de Machines du Haut-Rhin, Haut-Rhin, France, a company of France Application December 28, 1946, Serial No. 719,087
In France November 22, 1941

Section 1, Public Law 690, August 8, 1946
Patent expires November 22, 1961

2 Claims. (Cl. 29—52)

The present invention is relative to automatic lathes with a single spindle, comprising an auxiliary driving shaft and a turret.

In some of the known machines, the longitudinal motion of the carriages is determined by a shaft element transversal to the lathe and the transverse motion of a carriage is determined by a longitudinal shaft element geared with the transverse shaft element. The lathe covered by the present invention is characterized by the fact that the transverse shaft element also controls the longitudinal displacements of the turret.

In these automatic lathes, the control rack of one of the carriages with a longitudinal displacement can slide within the support-guide of the turret carriage.

One type of embodiment of an automatic lathe according to the present invention is described hereunder, by way of example, and represented on the appended drawings in which.

Figure 1:
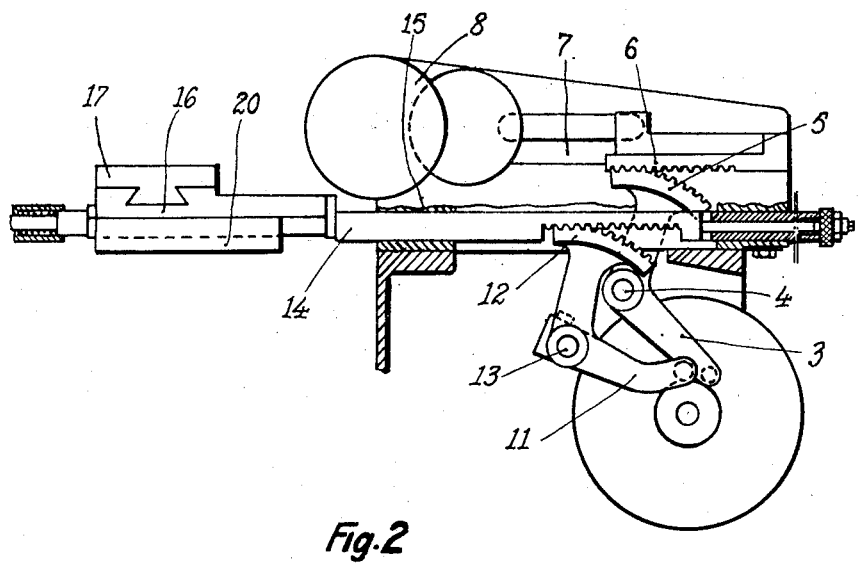
Figure 1 is a longitudinal elevation, partly in section, of the lathe.

In these figures, only the parts of the lathe necessary for the understanding of the invention have been represented.

It will be seen that the main shaft is constituted by two elements, I and I', perpendicular to each other; element I being transverse, and element I' longitudinal with respect to the lathe. On element I is mounted a cam, 2, acting, through bell crank lever 3, pivoted at 4 and provided with toothed sector 5, on a rack 6, associated with slide block 7, carrying turret 8.

On shaft element I, another cam 9 has been mounted, acting, through a bell crank lever II, provided with a toothed sector 12 and pivoted about shaft 13, mounted in the frame of the machine, on a rack 14, sliding within support 15, acting as a guide for turret carriage 7. Rack 14 acts on carriage 16 sliding itself inside a guide 20. Longitudinal carriage 16 offers a slide for transverse carriage 17 on which acts the end of lever 18, controlled itself by a cam keyed on main shaft element I'.

The control of a longitudinal carriage, on the other side of the lathe can be designed as follows:

On shaft element I is keyed yet another cam 19, acting on a lever 21, keyed itself on shaft 13. On this shaft 13 is keyed another lever provided with a toothed sector, gearing with a rack 14', acting on a longitudinal carriage 16', inside which slides the transverse carriage 17', on which acts lever 18', pivoted at 19', and subjected to the action of a cam 21', keyed on shaft element I'.

The carriages can be subjected, in a known manner, to the action of opposing springs pulling them backwards, so that there is always a contact between the levers and the cam profiles. It will be seen that the control devices for the longitudinal translations of the carriages have been realised in such a maner that they can be adapted to automatic lathes without impairing the control of the other organs.

It will be noted, besides, that the arrangement of the cams, placed one after the other, is such that they can be assembled and disassembled, and, therefore, very easily replaced.

Figure 2:
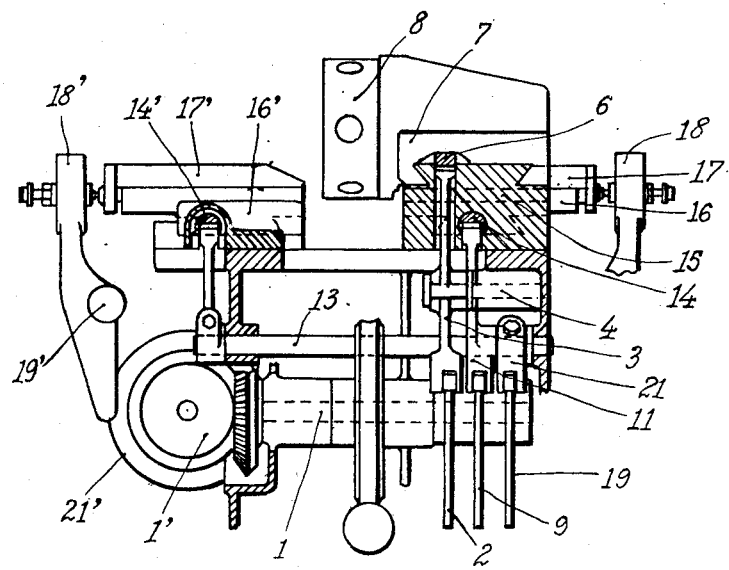
Figure 2 is an end view, also partly in section.
Figure 3:
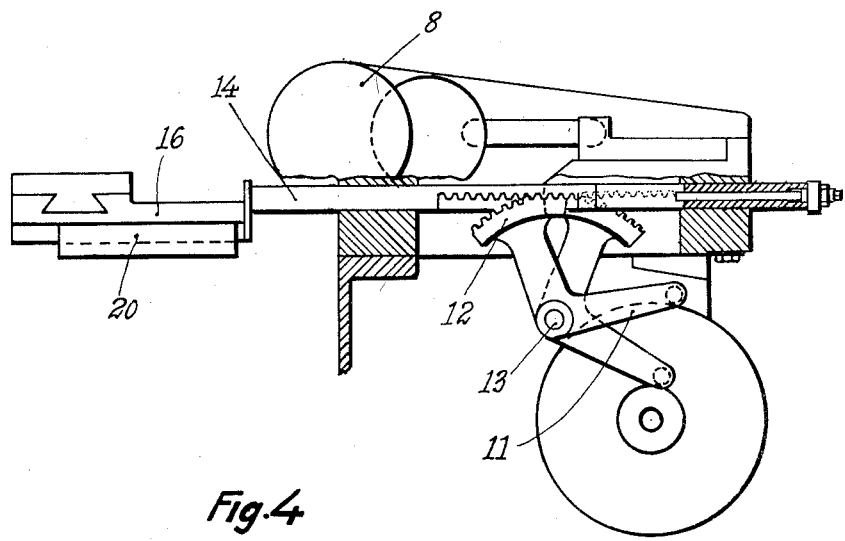
Figures 3 and 4 are variants thereof.
Figure 4:
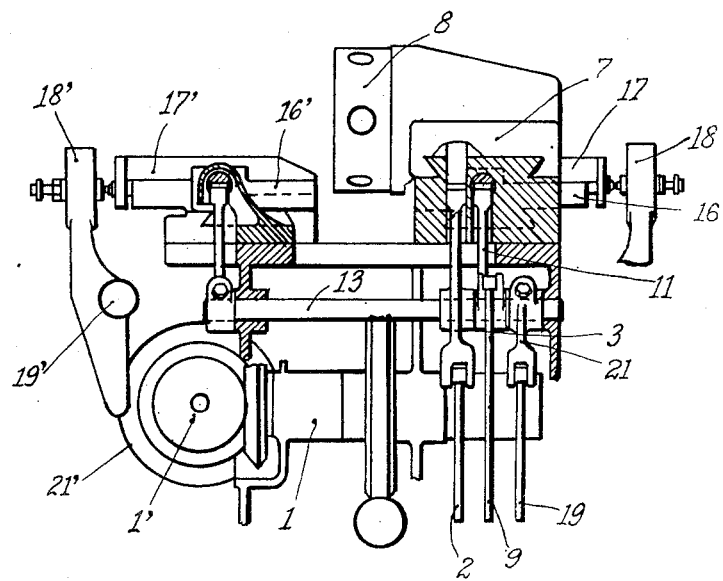

In the variant represented in Figures 3 and 4, all the control levers have been located on the same shaft; except for that the system is exactly the same and similar parts are designated by the same reference numbers as in Figures 1 and 2. Only a few of these references have been indicated.

An automatic lathe equipped according to the present invention allows the manufacture of a large number of parts which are difficult to manufacture simply with turret tools.

1. In a single spindled automatic lathe with a turret, a frame, a first shaft element mounted in said frame transversely with respect to the lathe, a second shaft element mounted in said frame longitudinally with respect to the lathe, an angular gearing rotatably connecting said first shaft element and said second shaft element, a support fixed to said frame having a slot and bore therethrough and a longitudinal guide thereon, a turret carriage movable along said guide, a longitudinal rack fixed to said turret carriage, a toothed member the teeth of which mesh with said rack, said toothed member moving partly in said slot of said support and oscillatably mounted with respect to said frame, means carried by said first shaft element for imparting movement to said oscillatable member, a carriage having longitudinal and transverse movements with relation to said lathe, a guide fixed to said frame for guiding said carriage longitudinally with respect to the lathe, a rack sliding longitudinally in said bore and acting on said carriage, a second toothed member the teeth of which mesh with said rack and oscillatably mounted with respect to said frame, means carried by the first shaft element for imparting movement to said second oscillatable member, means oscillatably mounted with respect to said frame for acting on said carriage, and means carried by the second shaft for imparting movement to said third oscillatable member.

2. In a single spindled automatic lathe, with a turret, a frame, a first shaft element mounted in said frame transversely with respect to the lathe, a second shaft element mounted in said frame longitudinally with respect to the lathe, angular gearing rotatably connecting said first shaft element and said second shaft element, a support fixed to said frame having a slot, a bore therethrough, and a longitudinal guide thereon, a turret carriage movable along said guide, a rack fixed to the turret carriage, a toothed element the teeth of which mesh with said rack, said toothed element moving partly in said slot of said support, and oscillatably mounted with respect to said frame, means carried by said first shaft element for imparting movement to said oscillatable member, two carriages having transverse and longitudinal movements with relation to said frame, two parallel guides one on each side of the lathe for guiding said carriages longitudinally with respect to the lathe, two racks acting longitudinally on said carriages, one of which slides in said bore, two further toothed members the teeth of which gear with said latter two racks, an auxiliary shaft rotatably mounted in the frame parallel to said first shaft element, and carrying freely one of said toothed members and fixedly the other toothed member, means carried by said first shaft element for imparting movements to said free toothed member and to said auxiliary shaft, means oscillatably mounted with respect to said frame for acting on one of said two carriages, and means carried by the second shaft for imparting movement to said third oscillatable member.

GEORGES EMILE CUTTAT.

REFERENCES CITED

The following references are of record in the file of this patent:

UNITED STATES PATENTS

| Number | Name | Date |
| --- | --- | --- |
| 302,525 | Stehli | July 22, 1884 |
| 502,675 | Macdougall | Aug. 1, 1893 |
| 889,386 | Mehl | June 2, 1908 |
| 1,356,020 | Sellew | Oct. 19, 1920 |
| 1,379,645 | Moore | May 31, 1921 |
| 1,793,279 | Fischer et al. | Feb. 17, 1931 |
| 2,008,012 | Foster | July 16, 1935 |